US012679471B2

(12) United States Patent
Martin et al.

(10) Patent No.: US 12,679,471 B2
(45) Date of Patent: Jul. 14, 2026

(54) DASHBOARD CROSSBEAM ASSEMBLY FOR A VEHICLE

(71) Applicant: FAURECIA INTERIEUR INDUSTRIE, Nanterre (FR)

(72) Inventors: Gregory Martin, Beauvais (FR);
Christophe Coupe, Crillon (FR);
Mickael Trannoy, Cauvigny (FR);
Annasaheb Bhujade, Pune (IN)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 403 days.

(21) Appl. No.: 18/359,599

(22) Filed: Jul. 26, 2023

(65) Prior Publication Data

US 2024/0034413 A1 Feb. 1, 2024

(30) Foreign Application Priority Data

Jul. 27, 2022 (FR) ...................................... 2207750

(51) Int. Cl.
*B62D 25/14* (2006.01)
*B62D 27/02* (2006.01)
(52) U.S. Cl.
CPC ........... *B62D 25/145* (2013.01); *B62D 27/02* (2013.01)
(58) Field of Classification Search
CPC .................................................. B62D 25/145
See application file for complete search history.

(56) References Cited

U.S. PATENT DOCUMENTS

| | | | | |
|---|---|---|---|---|
| 7,264,295 B2 * | 9/2007 | Vander Sluis | ....... | B62D 25/145 296/72 |
| 7,921,564 B2 * | 4/2011 | Baudart | .............. | B62D 25/145 296/72 |
| 8,146,986 B2 * | 4/2012 | Bierkamp | ............ | B62D 27/023 296/72 |
| 8,256,830 B2 * | 9/2012 | Hitz | ..................... | B62D 25/145 296/70 |
| 8,925,993 B2 * | 1/2015 | Noah-Navarro | ..... | B60H 1/0055 296/72 |
| 9,446,540 B2 * | 9/2016 | Marchetti | .............. | C08J 9/0085 |
| 9,446,800 B2 | 9/2016 | Davos | | |
| 10,315,708 B2 * | 6/2019 | Tatarinov | ............. | B62D 25/145 |
| 10,766,529 B2 | 9/2020 | Kong et al. | | |

(Continued)

FOREIGN PATENT DOCUMENTS

| | | | |
|---|---|---|---|
| EP | 3162671 A1 | 5/2017 | |
| JP | 2008068641 A | 3/2008 | |

(Continued)

OTHER PUBLICATIONS

German Search Report corresponding to application 102021119840.8, Jul. 20, 2024, 9 pages.

*Primary Examiner* — Jonathan Malikasim
(74) *Attorney, Agent, or Firm* — Reising Ethington P.C.

(57) ABSTRACT

A dashboard crossbeam assembly for a vehicle includes a dashboard crossbeam with a first longitudinal portion, preferably made of plastic-containing material, the first longitudinal portion forming a plurality of fastening interfaces. Each fastening interface has a recess for receiving a lug. The dashboard crossbeam assembly further includes at least one fastening tab having at least one lug received in one of the recesses forming a fastening interface.

17 Claims, 5 Drawing Sheets

(56) References Cited

U.S. PATENT DOCUMENTS

| | | | | |
|---|---|---|---|---|
| 11,440,595 | B2 * | 9/2022 | Richardson | .......... B62D 29/001 |
| 12,024,231 | B2 * | 7/2024 | Zhang | .................. B62D 25/145 |
| 2008/0197669 | A1 | 8/2008 | Schleichert | |
| 2014/0103685 | A1 | 4/2014 | Mani | |
| 2017/0120956 | A1 | 5/2017 | Trannoy et al. | |
| 2021/0053625 | A1 | 2/2021 | Richardson | |
| 2022/0111898 | A1 | 4/2022 | Kelk et al. | |
| 2023/0382465 | A1 * | 11/2023 | Coupe | .................... B62D 27/02 |
| 2023/0415821 | A1 * | 12/2023 | Coupe | ................. B62D 29/001 |

FOREIGN PATENT DOCUMENTS

| | | | |
|---|---|---|---|
| JP | 4496592 | B2 | 7/2010 |
| KR | 20220090999 | A | 6/2022 |

* cited by examiner

DASHBOARD CROSSBEAM ASSEMBLY FOR A VEHICLE

TECHNICAL FIELD

The present invention relates to a dashboard crossbeam assembly (CCB, or Cross Car Beam), for a vehicle. The invention also relates to a dashboard assembly for a vehicle, especially for a motor vehicle, including such a crossbeam assembly.

BACKGROUND

In the automotive field, a dashboard crossbeam assembly is known, which especially allows the dashboard to be fastened to the body of the motor vehicle. Such a dashboard crossbeam assembly may also have a safety function, for example by absorbing part of the energy in the event of a frontal impact causing the body to deform, in order to limit the deformation of the dashboard.

Conventionally, such a dashboard crossbeam assembly is made of metal.

However, a dashboard assembly, referred to as "hybrid", is known, for example from application EP-A-3,162,671, the crossbeam of which includes a first longitudinal portion made of a first material, especially made of metal, and a second longitudinal portion made of a second material, especially made of composite material. Such a dashboard crossbeam assembly is especially lighter than an identical dashboard crossbeam assembly, entirely made of metal. Dashboard accessories are fastened to the first longitudinal portion and to the second longitudinal portion of the crossbeam.

Such a design, however, requires a mold for molding the second longitudinal portion, specific to each dashboard crossbeam assembly developed. Indeed, the first and second longitudinal portions of the crossbeam differ a priori as a function of the accessories to be fastened to the crossbeam, and the positions thereof. Thus, to produce two different dashboard crossbeam assemblies, it is necessary to implement two separate molds. However, such molds are expensive.

SUMMARY

The present invention aims to improve the situation.

To this end, a dashboard crossbeam assembly for a vehicle is proposed, including:
a dashboard crossbeam with a first longitudinal portion, preferably made of plastic-containing material, the first longitudinal portion forming a plurality of fastening interfaces, each fastening interface comprising a recess for receiving a lug, and
at least one fastening tab comprising at least one lug received in one of the recesses forming a fastening interface.

Thus, advantageously, a longitudinal portion forms a large number of fastening interfaces, allowing a wide variety of configurations for fastening accessories to the crossbeam. Thus, a single longitudinal portion, especially made of plastic-containing material, can be implemented, for example, in different configurations of dashboard crossbeam assemblies.

According to preferred embodiments, the dashboard crossbeam assembly has one or more of the following features, taken alone or in combination:

the at least one fastening tab comprises two lugs, each received in a respective recess;
the plurality of fastening interfaces comprises:
a first plurality of fastening interfaces in the form of recesses for receiving a lug, opening onto a first face of the first longitudinal portion, and
a second plurality of fastening interfaces in the form of recesses for receiving a lug, opening onto a second face of the first longitudinal portion,
the first and second faces of the first longitudinal portion preferably being opposite each other;
the dashboard crossbeam assembly comprises a first bracket for fastening to the body of a vehicle, the first bracket defining at least one interface for fastening the dashboard crossbeam assembly to the body of the vehicle, wherein one of the first fastening bracket and the first longitudinal portion of the crossbeam defines a first protruding relief, and the other one of the first fastening bracket and the first longitudinal portion of the crossbeam defines a first complementary recess for tightly receiving the first protruding relief;
the crossbeam comprises a second longitudinal portion, preferably made of metal, fastened to the first longitudinal portion, such that the first and second longitudinal portions of the crossbeam extend substantially next to each other in a direction in which the crossbeam extends;
the dashboard crossbeam assembly further comprises a second fastening bracket, attached to one end of the second longitudinal portion of the crossbeam, the second fastening bracket defining at least one interface for fastening the dashboard crossbeam assembly to the body of the vehicle, wherein one of the second fastening bracket and the second longitudinal portion of the crossbeam defines a second protruding relief, and the other one of the second fastening bracket and the second longitudinal portion of the crossbeam defines a second complementary recess for tightly receiving the second protruding relief;
at least one of the first longitudinal portion and the second longitudinal portion includes, at one longitudinal end, a recess for tightly receiving a longitudinal end of the other, among the second longitudinal portion and the first longitudinal portion;
the dashboard crossbeam assembly further comprises a connector for fastening the first and second longitudinal portions of the crossbeam, with:
at least one lug tightly received in a recess of the first longitudinal portion of the crossbeam, forming a fastening interface;
a first recess for receiving a longitudinal end of the first longitudinal portion of the crossbeam; and
a second recess for receiving a longitudinal end of the second portion of the crossbeam, the first recess of the fastening connector and the longitudinal end of the first longitudinal portion of the crossbeam received therein being preferably suitable for limiting or even preventing the movements of the first longitudinal portion of the crossbeam relative to the fastening connector;
the fastening connector forms a strut for fastening the dashboard crossbeam assembly to the body of a motor vehicle and/or a fastening tab for fastening an accessory to the crossbeam;
the dashboard crossbeam assembly further comprises at least one screw for fastening the fastening connector with the first longitudinal portion and/or the second longitudinal portion of the crossbeam, the dashboard crossbeam assembly preferably comprising a first screw for fastening the fastening connector to the first longitudinal portion of the crossbeam and a second screw for fastening the fastening connector to the first and second longitudinal portions of the crossbeam;

the first longitudinal portion comprises a substantially S-shaped cross section, each recess being delimited by a central branch and an end branch of the S, on the one hand, and by two reinforcing ribs, on the other hand; and the dashboard crossbeam assembly comprises a support for fastening a steering column, fastened to the second longitudinal portion of the crossbeam.

According to another aspect, a dashboard assembly for a vehicle is described, comprising a dashboard and a dashboard crossbeam assembly as described hereinbefore in all its combinations, the dashboard being fastened to the dashboard crossbeam assembly.

BRIEF DESCRIPTION OF THE DRAWINGS

Other features, details and advantages will become apparent on reading the following detailed description and the analysis of the appended drawings, in which.

DETAILED DESCRIPTION

In the various figures, the same references designate elements that are identical or are identical in function. Only the differences between the different examples presented are described in detail.

Figure 1:
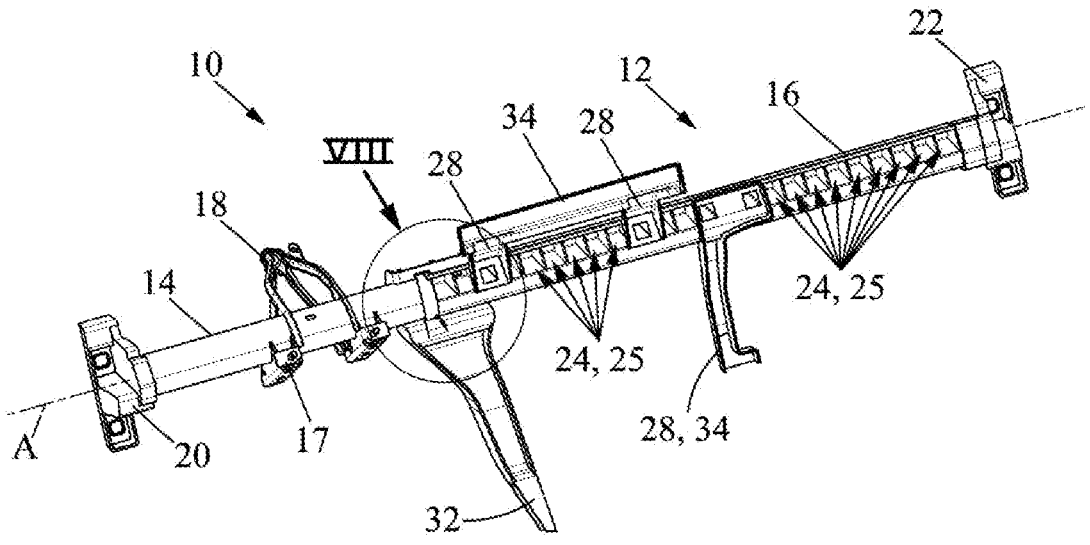
FIG. 1 is a view according to a first perspective of an example of a dashboard crossbeam assembly for a motor vehicle, wherein the crossbeam includes a first longitudinal portion, herein made of plastic-containing material, and a second longitudinal portion, herein made of metal.
Figure 2:
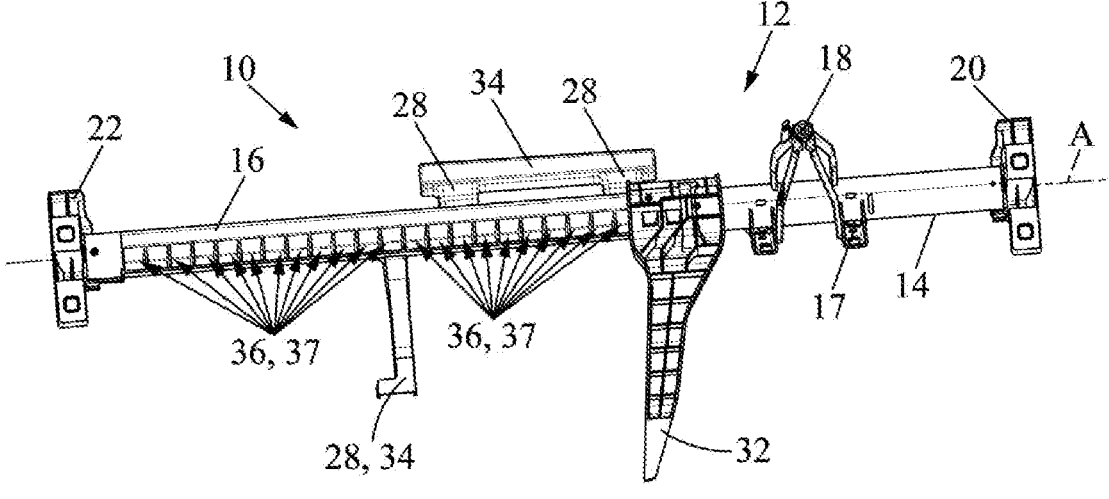
FIG. 2 schematically depicts according to a second perspective, opposite the first perspective, the example of a dashboard crossbeam assembly for a motor vehicle of FIG. 1.

FIG. 1 and FIG. 2 depict an example of a dashboard crossbeam assembly 10 for a motor vehicle.

The dashboard crossbeam assembly 10 is intended to form a structural element of the dashboard D of the motor vehicle V. The dashboard crossbeam assembly 10 is especially intended to stiffen the body BIW (Body In White) of the motor vehicle V and/or to support equipment or accessories of the motor vehicle V, especially the dashboard D and/or a steering column and/or air ducts of a heating, ventilation and air-conditioning HVAC system of the passenger compartment of the motor vehicle V and/or a screen S and/or a glove compartment G and/or an airbag module Ab and/or a heads-up display H.

As illustrated, the dashboard crossbeam assembly 10 firstly comprises a crossbeam 12. The crossbeam 12 extends mainly along a longitudinal axis A intended to be oriented in a transverse direction in the motor vehicle V. The crossbeam 12 is said to be hybrid in that it includes a first longitudinal portion 16, in this case made of plastic-containing material, and a second longitudinal portion 14, made of metal. The term "plastic-containing material" is understood here to mean a plastic material, optionally loaded with reinforcing fibers, especially glass fibers. Thus, plastic-containing materials comprise plastics and composite materials. The material of which the first longitudinal portion 16 of the crossbeam 12 is formed comprises for example at least 50% by mass of glass or carbon fibers, preferably at least 60% by mass of glass or carbon fibers.

Herein, the two longitudinal portions 14, 16 extend adjacent to each other in the direction of the axis A in which the crossbeam 12 extends. In other words, herein, a majority of the length of the first longitudinal portion 16 and/or a majority of the length of the second longitudinal portion 14 are not superimposed, in a direction perpendicular to the direction of the axis A in which the crossbeam 12 extends.

As shown, the second portion 14 has a substantially tubular shape. Herein, the second portion 14 has a substantially circular cross section. As can be seen in FIG. 1 and FIG. 2, the dashboard crossbeam assembly 10 comprises a steering column support 17 fastened to the second portion 14. Especially, the steering column support 17 can be welded to the second portion 14. Specifically, it appears preferable for such a steering column support 17 to be fastened to a portion 14 of the crossbeam 12 made of metal, in order to ensure satisfactory resistance in the event of an impact, especially a frontal impact. In other words, such a configuration wherein a steering column support 17 is fastened to a metal portion of the crossbeam 12 appears to be preferable for ensuring the safety of the driver of the motor vehicle V.

Furthermore, a device 18 for fastening the crossbeam 12 on to the body BIW of the vehicle V, especially the apron Ta of the body BIW of the motor vehicle and/or to the lower bay crossbeam T of the body BIW of the motor vehicle V, may be fastened to the second longitudinal portion 14 of the crossbeam 12. For example, as shown, the fastening device 18 is arranged substantially at the same level longitudinally on the second longitudinal portion 14 of the crossbeam 12 as the steering column support 17.

The dashboard crossbeam assembly 10 further comprises a first bracket 20 fastened to a longitudinal end of the second portion 14 of the crossbeam 12, forming one end of the crossbeam 12. The first bracket 20 is for example press-fit and/or screwed onto the second portion 14 of the crossbeam 12. Alternatively, the first bracket 20 is for example welded to the second portion 14 of the crossbeam 12. The first bracket 20 is for example made of plastic-containing material or metal. The first bracket 20 makes it possible to fasten the dashboard crossbeam assembly 10 onto the body BIW of the motor vehicle V, for example to a first A-pillar of the body BIW of the motor vehicle V.

The dashboard crossbeam assembly 10 comprises a second bracket 22 for fastening the crossbeam 12 onto the body BIW of the motor vehicle V. The second bracket 22 makes it possible, for example, to fasten the crossbeam 12 to a second A-pillar of the body BIW of the motor vehicle V. The second bracket 22 is for example made of plastic-containing material or metal. The second bracket 22 is for example press-fit and/or screwed and/or welded onto the first portion 16 of the crossbeam 12.

Hereinafter, the first portion 16 of the crossbeam 12 is described in more detail, especially in view of FIG. 3 to FIG. 6.

Figure 3:
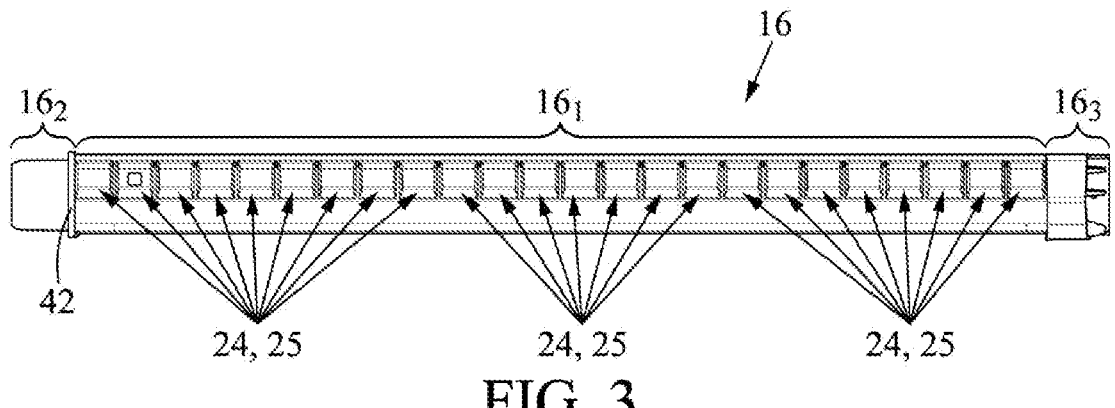
FIG. 3 is a view according to a first perspective of the first longitudinal portion of the crossbeam implemented in the dashboard crossbeam assembly for a motor vehicle of FIG. 1.
Figure 4:
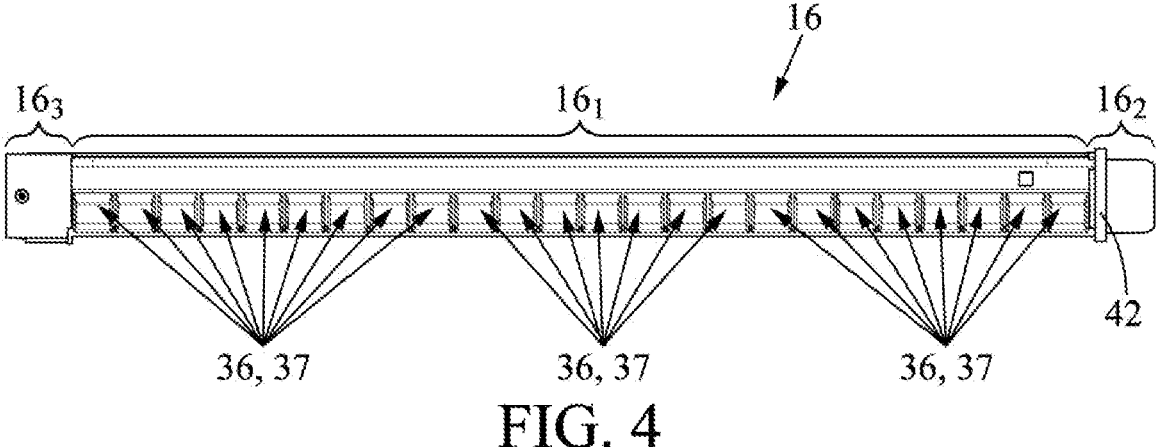
FIG. 4 is a view according to a second perspective of the first longitudinal crossbeam portion of FIG. 3.

As can be seen in FIG. 3 and FIG. 4, the first portion 16 of the crossbeam 12 comprises substantially a central portion $16_1$ having a cylindrical outer shape, extending in the direction of the axis A in which the crossbeam 12 extends, between a first end relief $16_2$ and a second end relief $16_3$. The term "cylindrical" is understood here to mean a shape having a cross section with a constant contour, extending along a longitudinal axis, corresponding herein to the axis A in which the crossbeam 12 extends. The central part $16_1$ of the first portion 16 of the crossbeam 12 preferably has a substantially S-shaped cross section.

The central part $16_1$ of the first portion 16 of the crossbeam 12 forms a plurality of first fastening interfaces 24, herein in the form of first recesses 25. Herein, all the first recesses 25 are identical. According to the example shown, twenty-four first recesses 25 are formed over the entire length of the central part $16_1$ of the first portion 16 of the crossbeam 12. Of course, this number is in no way limiting and a different number of first recesses 25 can be formed on the central part $16_1$. Especially, a number of first recesses 25 greater than or equal to 4, preferably greater than or equal to 8, and/or less than or equal to 40, preferably less than or equal to 30, may be formed on the central part $16_1$ of the first portion 16 of the crossbeam 12. In addition, herein, the first recesses 25 are formed over substantially the entire length of the central part $16_1$ of the first portion 16 of the crossbeam 12. Alternatively, first recesses 25 can only be formed over a limited length of the central part $16_1$ of the first portion 16 of the crossbeam 12. Preferably, first recesses 25 are formed on at least 25%, preferably on at least 50%, more preferably on at least 75% and even more preferably on 100% of the length of the central part $16_1$ of the first portion 16 of the crossbeam 12.

When the central part $16_1$ of the first portion 16 of the crossbeam 12 has a substantially S-shaped cross section, the S shape can be defined by a central branch, extending between two end branches, preferably substantially parallel to the central branch, each end branch being connected to the central branch by a connecting branch, preferably substantially vertical. With such an S-shaped cross section of the central part $16_1$ of the first portion 16 of the crossbeam 12, the recesses 25 can be delimited by the central branch and one of the two end branches—also referred to as outer or extreme, especially upper—of the S, on the one hand, and by two neighboring ribs or reinforcing walls, on the other hand, the reinforcing ribs or walls extending between the faces of the central part $16_1$ of the first portion 16 of the crossbeam 12 forming the central branch and the second branch. For example, the reinforcing ribs or walls extend substantially vertically.

Herein, each first recess 25 is substantially prism-shaped, with a square cross section, extending along a longitudinal axis comprised in a plane normal to the direction A in which the crossbeam 12 extends. Of course, other shapes of the first recesses can be imagined, which are accessible to a skilled person.

Each first recess 25 thus makes it possible to receive, tightly, a lug 26 of a fastening tab 28. Each lug 26 has a shape that is complementary with a first associated recess 25. However, to facilitate the insertion of the lug 26 into a first recess 25, the lug 26 can be provided with blades 30 that come into contact with the walls of a first recess 25 when the lug 26 is inserted into the first recess 25. Thus, the friction between the lug 26 and the walls of the first associated recess 25 occurs on a smaller surface, facilitating the insertion of the lug 26 into the first associated recess 25. Each blade 30 may extend for example substantially perpendicularly to the surface from which it originates. Preferably, the lugs 26 are hollow to make them easier to form, especially by molding. Alternatively, the lug 26 is received in the first recess 25 with play. In this case, the lug 26 can be fastened in the first recess 25 by means of a fastening element, such as for example a screw and/or a rivet.

In one embodiment not shown, a device for fastening by elastic fitting (or fastening clip), for example made of metal, is integrated into the first recess 25, preferably at the bottom of the first recess 25. The lug 26 can then include a complementary shape, for example a complementary relief, to cooperate with this fastening device by elastic fitting.

Figure 5:
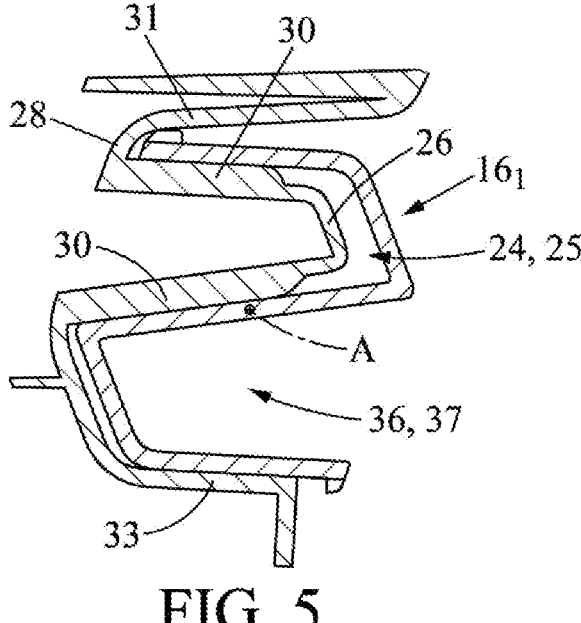
FIG. 5 schematically illustrates in a section view, the insertion of lugs of fastening tabs into first recesses of the first longitudinal crossbeam portion of FIG. 3 and FIG. 4.

As can be seen especially in FIG. 5, each fastening tab 28 may further include a first surface 31, herein upper, and/or a second surface 33, herein lower, defining a recess tightly receiving the first longitudinal portion 16 of the crossbeam 12. Thus, the first longitudinal portion 16 of the crossbeam 12 can be held tightly between at least one of:

both surfaces 31, 33, between the first surface 31 and a lug 26 of the fastening tab 28, and/or between the second surface 33 and a lug 26 of the fastening tab 28.

Herein, in addition, the central part $16_1$ of the first portion 16 of the crossbeam 12 forms a plurality of second fastening interfaces 36. Each second fastening interface 36 is herein produced in the form of a second recess 37. Herein, all the second recesses 37 are identical. According to the example shown, twenty-four second recesses 37 are formed over the entire length of the central part $16_1$ of the first portion 16 of the crossbeam 12. Of course, this number is in no way limiting and a different number of second recesses 37 can be formed on the central part $16_1$. Especially, a number of second recesses 37 greater than or equal to 4, preferably greater than or equal to 8, and/or less than or equal to 40, preferably less than or equal to 30, may be formed on the central part $16_1$ of the first portion 16 of the crossbeam 12. In addition, herein, the second recesses 37 are formed over substantially the entire length of the central part $16_1$ of the first portion 16 of the crossbeam 12. Alternatively, second recesses 37 can only be formed over a limited length of the central part $16_1$ of the first portion 16 of the crossbeam 12. Preferably, second recesses 37 are formed on at least 25%, preferably on at least 50%, more preferably on at least 75% and even more preferably on 100% of the length of the central part $16_1$ of the first portion 16 of the crossbeam 12.

When the central part $16_1$ of the first portion 16 of the crossbeam 12 has a substantially S-shaped cross section, as previously described, the recesses 37 can be delimited by the central branch and one of the two end branches—also referred to as outer or extreme, especially lower—of the S, on the one hand, and by two neighboring ribs or reinforcing walls, on the other hand, the reinforcing ribs or walls extending between the faces of the central part $16_1$ of the first portion 16 of the crossbeam 12 forming the central branch and the second branch. For example, the reinforcing ribs or walls extend substantially vertically.

Herein, each second recess 37 is substantially prism-shaped, with a square cross section, extending along a longitudinal axis comprised in a plane normal to the direction A in which the crossbeam 12 extends. Of course, other shapes of the second recesses 37 can be imagined, which are accessible to a skilled person.

The second recesses 37 are formed herein so as to open onto a face of the central part $16_1$ of the first portion 16 of the crossbeam 12, opposite the face of the central part $16_1$ of the first portion 16 of the crossbeam 12, onto which the first recesses 25 open.

Figure 6:
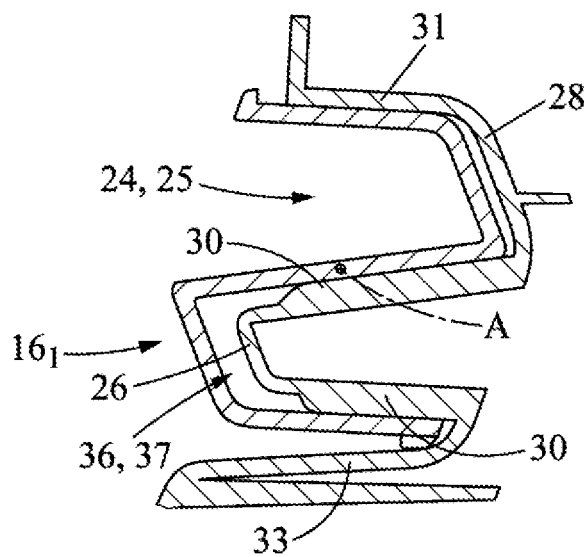
FIG. 6 schematically illustrates in a section view, the insertion of lugs of fastening tabs into second recesses of the first longitudinal crossbeam portion of FIG. 3 and FIG. 4.

Herein, as shown in FIG. 5 and in FIG. 6, in a plane transverse to the axis A extending the crossbeam 12, the section of each second recess 37 is substantially symmetrical to the section of a first recess 25, with respect to the axis A in which the crossbeam 12 extends.

Each second recess 37 makes it possible to receive, tightly, a lug 26 of a fastening tab 28. To facilitate the insertion of the lug 26 into a second recess 37, the lug 26 can be provided with blades 30 that come into contact with the walls of a second recess 37 when the lug 26 is inserted into the second recess 25. Thus, the friction between the lug 26 and the walls of the second associated recess 37 occurs on a smaller surface, facilitating the insertion of the lug 26 into the first associated recess 37. In this case, each blade 30 may extend perpendicularly to the surface from which it originates.

Alternatively, the lug 26 can be received in the second recess 37 with play. In this case, the lug 26 can be fastened in the second recess 37 by means of a fastening element, such as for example a screw and/or a rivet.

In one embodiment not shown, a device for fastening by elastic fitting (or fastening clip), for example made of metal, is integrated into the second recess 37, preferably at the bottom of the second recess 37. The lug 26 can then include a complementary shape, for example a complementary relief, to cooperate with this fastening device by elastic fitting.

As can be seen especially in FIG. 6, each fastening tab 28 may further include a first surface 31, herein upper, and/or a second surface 33, herein lower, defining a recess tightly receiving the first longitudinal portion 16 of the crossbeam 12. Thus, the first longitudinal portion 16 of the crossbeam 12 can be held tightly between at least one of:

both surfaces 31, 33, between the first surface 31 and a lug 26 of the fastening tab 28, and/or between the second surface 33 and a lug 26 of the fastening tab 28.

Figure 10:
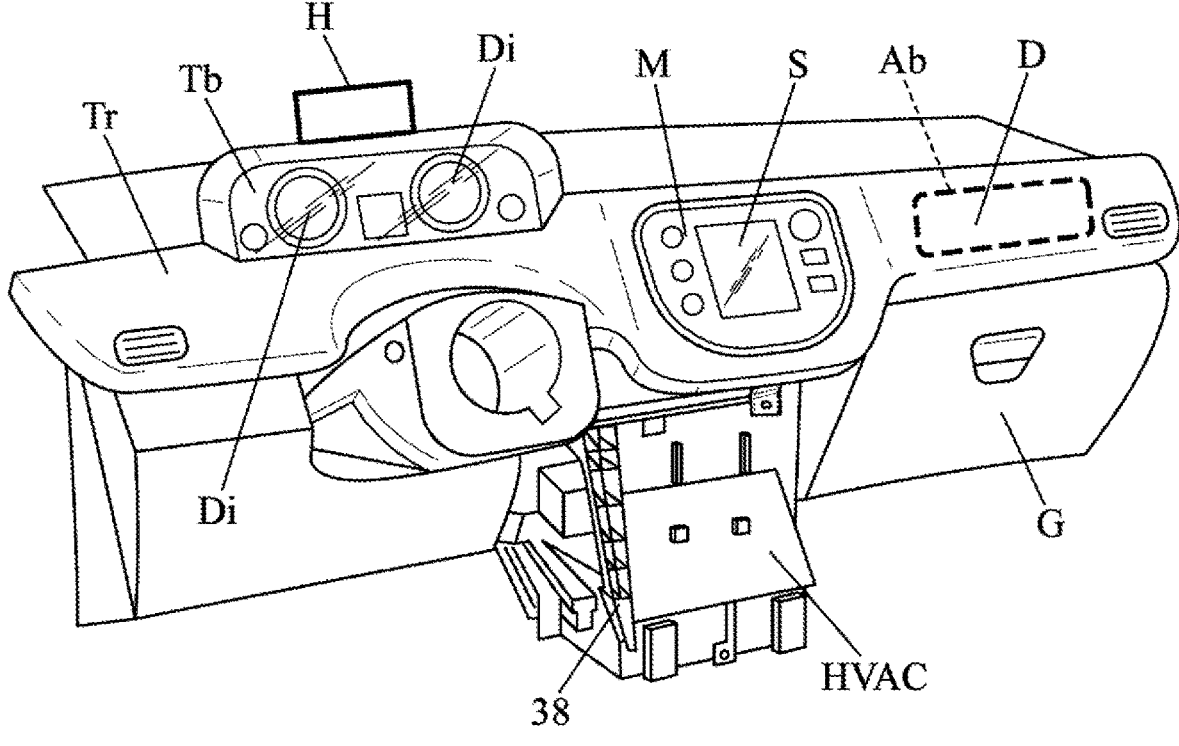
FIG. 10 schematically illustrates in perspective a motor vehicle dashboard, fastened to the body of a motor vehicle by means of the dashboard crossbeam assembly of FIG. 1.

Each fastening tab 28 belongs to a support 34 for fastening an accessory to the crossbeam 12. As illustrated especially in FIG. 10, each accessory that can thus be fastened to the crossbeam 12, especially on the first portion 16 of the crossbeam 12, may for example be chosen from:

a glove compartment G;

an airbag module Ab;

an electronic module M;

a screen S, especially a central screen;

a dashboard D;

an interior trim Tr, especially on the driver side and/or passenger side;

a head-up display H;

a dashboard Tb comprising at least one equivalent counter or device Di for displaying information relating to the motor vehicle V, especially a velocity and/or engine speed counter of the motor vehicle V and/or at least one such counter or display device Di.

As can be seen in FIG. 1, each support 34 for fastening an accessory to the crossbeam 12 may include one fastening tab 28, two fastening tabs 28 or even more than two fastening tabs 28. The number of fastening tabs 28 of a support 34 can especially be chosen based on the weight of the accessory to be supported.

Alternatively or additionally, at least one fastening tab 28 can be fastened to the body BIW of the motor vehicle V thus strengthening the fastening of the dashboard crossbeam assembly 10 to the body BIW of the motor vehicle V. Such a fastening tab 28 may for example be fastened to the apron Ta of the body BIW of the motor vehicle or a lower bay crossbeam T of the body BIW of the motor vehicle V.

It is recalled here that the body BIW of a motor vehicle V comprises, from front to rear, an engine compartment which is closed by a hood and which is separated from the passenger compartment of the vehicle by an apron, Ta and, in the upper part, by a lower bay crossbeam T The lower bay crossbeam T may be integral with the apron Ta. The lower bay crossbeam Ta then differs from the apron T in that it extends substantially horizontally while the apron Ta instead extends rather vertically or obliquely in the vertical direction. The lower bay crossbeam T is intended to support a lower part of a windscreen of the motor vehicle V.

Furthermore, the second end relief $16_3$ is suitable for allowing fastening of the first bracket 20, for example by shape matching. For example, the first bracket 20 forms a recess for tightly receiving at least part of the second end relief $16_3$ and/or the second end relief $16_3$ forms a recess for receiving a complementary relief of the first bracket 20. Preferably, the first bracket 20 forms a recess for tightly receiving at least part of the second end relief $16_3$ and the second end relief $16_3$ forms a recess for receiving a complementary relief of the first bracket 20, the reliefs and recesses being coaxial, for example having as their axis the axis A in which the crossbeam 12 extends. Alternatively or additionally, the second end relief $16_3$ and the first bracket 20 each comprise a relief, for example a hole, in order to allow the first portion 16 of the crossbeam 12 and the first tip 20 to be screwed together, especially when the recess of the first bracket 20 receives at least part of the second end relief $16_3$ and/or the recess in the second end relief $16_3$ receives the complementary relief of the first bracket 20.

The first end relief $16_2$ includes at least one of a relief suitable for being tightly received in the second longitudinal portion 14 and a relief suitable for tightly receiving one end of the second longitudinal portion 14. Preferably, the first end relief $16_2$ includes both a relief suitable for being tightly received in the second longitudinal portion 14 and a relief suitable for tightly receiving one end of the second longitudinal portion 14. As shown, the first end relief $16_2$ projects longitudinally from a substantially planar base 42, perpendicular to the axis A in which the crossbeam 12 extends. The base 42 protrudes radially with respect to the central part $16_3$ of the first portion 16 of the crossbeam 12. Herein, the base 42 is generally disc-shaped, with the center thereof comprised on the axis A in which the crossbeam 12 extends.

Figure 7:
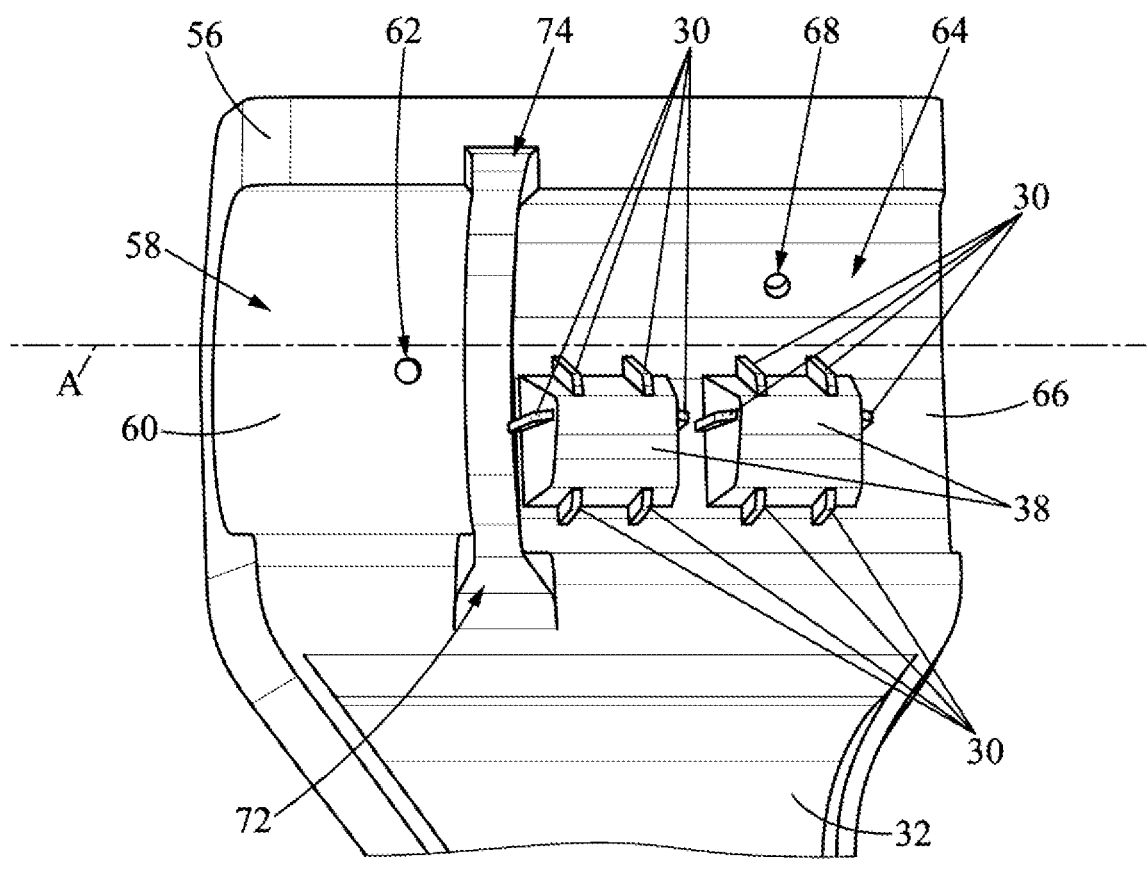
FIG. 7 depicts in perspective a detail of a fastening tab forming a fastening connector of the first and second longitudinal crossbeam portions.
Figure 8:
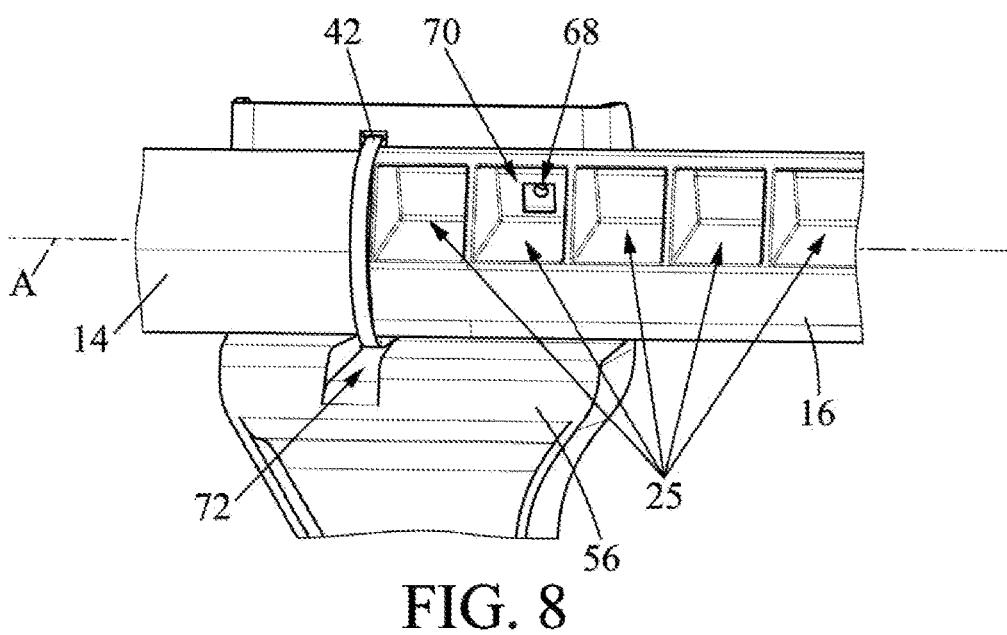
FIG. 8 depicts in perspective the first and second longitudinal crossbeam portions fastened together by means of the fastening connector of FIG. 7.
Figure 9:
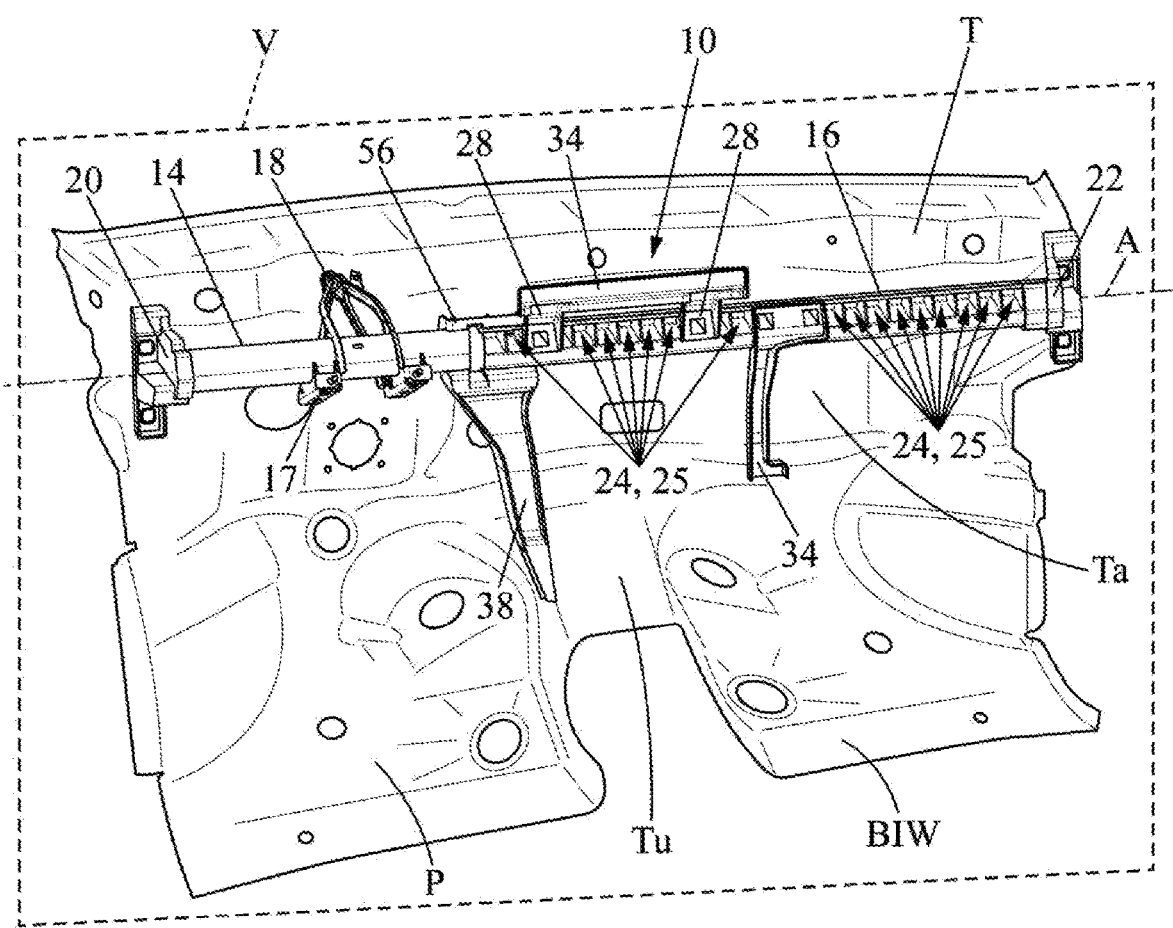
FIG. 9 schematically represents in perspective the fastening of the dashboard crossbeam assembly for a motor vehicle of FIG. 1 to the body of a motor vehicle.

The crossbeam 12 obtained by fitting, here forcibly, first and second longitudinal portions 14, 16 together, is received in a fastening connector 56, as shown in FIG. 7. The term "fitting" is understood herein to mean a partial overlap of the two longitudinal portions 14, 16, especially the reception of at least part of one longitudinal portion in the other longitudinal part. The expression "fitting by force" is understood to mean partial overlapping with friction, especially a reception of at least part of one longitudinal portion in the other longitudinal part, with friction.

As is especially visible in FIG. 1 or FIG. 2, the fastening connector 56 extends outside the first and second longitudinal portions 14, 16. Preferably, the fastening connector 56 is however in contact with each of the first and second longitudinal portions 14, 16, for example on part of the first and second longitudinal portions 14, 16 matching an angular sector of a longitudinal segment of the first and second longitudinal portions 14, 16. Contact between the fastening connector 56 and each of the first and second longitudinal portions 14, 16, outside these longitudinal portions 14, 16 contributes to reinforcing the fastening of the first and second longitudinal portions 14, 16 together, especially by limiting or even avoiding at least some relative movements of the longitudinal portions 14, 16, with respect to each other, and/or a movement of the assembly formed by the first and second longitudinal portions 14, 16 with respect to the body BIW of the vehicle.

As shown in this FIG. 7, the fastening connector 56 includes first of all a first recess 58 for receiving an end portion of the second portion 14 of the crossbeam 12. Herein, the first recess 58 is formed by a surface 60 bulging so as to complement the outer surface of the end portion of the second portion 14 of the crossbeam 12. Thus, the surface 60 herein has the shape of an angular sector of a cylinder, with a radius substantially equal to the outer radius of the second portion 14 of the crossbeam 12 and with an axis matching the axis A in which the crossbeam 12 extends in the dashboard crossbeam assembly 10.

The surface 60 herein has a through-hole 62 intended to be arranged facing a hole passing through the wall of the end portion of the second portion 14 of the crossbeam 12 in the dashboard crossbeam assembly 10. It is thus possible to fasten together the fastening connector 56 and the second portion 14 of the crossbeam 12, received in the first recess 58, at a first fastening point, for example by means of a removable fastening device. Removable fastening makes it possible to remove the crossbeam at the end of life, to recover its constituent elements and recycle them. A removable fastening device is for example a screw or a bolt. In contrast, a weld, for example, does not appear as a removable fastening device. Herein, the through-hole 62 is intended to be opposite an opening in the first end relief $16_2$ of the first portion 16 of the crossbeam 12 and an opening in the second longitudinal portion 14 of the crossbeam 12. Thus, at this first fastening point, the fastening connector 56, the first portion 16 of the crossbeam 12 and the second portion 14 of the crossbeam 12 are fastened together, using a single removable fastening device.

The fastening connector 56 further includes a second recess 64 suitable for receiving an end part of the first portion 16 of the crossbeam 12, arranged in the vicinity of the first end relief $16_2$. The second recess 64 is thus delimited by a cylindrical surface 66, having as its axis the axis A in which the crossbeam 12 extends, in the dashboard crossbeam assembly 10. The cross section of the surface 66 is substantially complementary with the outer contour of the cross section of the first portion 16 of the crossbeam 12, in particular in the vicinity of the first end relief $16_2$.

In addition, herein, two lugs 38 as described previously, extend from the surface 66 delimiting the second recess 64 of the fastening connector 56. Both lugs 38 are herein suitable for being tightly received in second recesses 37 of the first portion 16 of the crossbeam 12. As shown, the lugs 38 may comprise blades 30 extending perpendicularly to the surface from which the blades 30 originate. The lugs 38 thus make it possible to fasten the fastening connector 56 to the first portion 16 of the crossbeam 12.

Herein, in addition, a through-hole 68 is provided through the surface 66 delimiting the second recess 64, intended to be opposite an opening 70 through a wall delimiting a first recess 25 in the first portion 16 of the crossbeam 12. It is thus possible to fasten the fastening connector 56 and the first portion 16 of the crossbeam 12 together at a second fastening point, for example by means of a removable fastening device. Herein again, removable fastening device is understood to mean, for example, a screw or a bolt.

The fastening connector 56 further includes a third recess 72, arranged between the first and second recesses 58, 64 in the direction of the axis A in which the crossbeam 12 extends, in the dashboard crossbeam assembly 10. The third recess 72 includes a hollow groove 74, suitable for receiving the base 42 of the first end relief $16_2$ of the first portion 16 of the crossbeam 12. Herein, the groove 74 of the third recess 72 is shaped to limit or even prevent a movement of the base 42 received in the groove 74 in the direction of the axis A in which the crossbeam 12 extends, in the dashboard crossbeam assembly 10. Herein, the groove 74 is delimited by a wall in the form of a cylinder portion, having as its axis the axis A in which the crossbeam 12 extends.

According to a variant, a fastening element fastens the fastening connector 56, at the third recess 72, both with a portion of the first longitudinal portion 16 of the crossbeam 12 and with a portion of the second longitudinal portion 14 of the crossbeam 12. Preferably, the fastening element is in contact with the first longitudinal portion 16 and the second longitudinal portion 14 at the area at which the first and second longitudinal portions 16, 14 fit into each other. The fastening element is for example a screw and/or a rivet.

The fastening connector 56 contributes to particularly robust fastening together of the two longitudinal portions 14, 16 of the crossbeam 12.

Furthermore, in the example shown, the fastening connector 56 forms a strut 32. The strut 32 may for example be intended to be fastened to the body BIW of the motor vehicle V, especially to the tunnel Tu formed by the floor of the body BIW for receiving a transmission shaft and/or a gas exhaust duct. Alternatively, the strut 32 can be intended to be fastened to a box of a heating, ventilation and air conditioning system HVAC for the passenger compartment of the motor vehicle V. In this case, the fastening of the two longitudinal portions 14, 16 of the crossbeam 12 is further reinforced.

Alternatively, the fastening connector 56 may form a fastening tab 28, intended to allow an accessory to be fastened to the crossbeam 12.

The present invention is not limited to only the examples described hereinbefore, but rather is capable of numerous variants accessible to a skilled person.

Especially, in the example described hereinbefore, the second portion 14 of the crossbeam 12 is made of metal and the first portion 16 of the crossbeam 12 is made of plastic-containing material. However, these first and second portions 14, 16 of the crossbeam 12 can be made of other materials. Preferably, however, the first and second portions 14, 16 of the crossbeam 12, are made of different materials.

According to another variant also, the crossbeam 12 comprises a single longitudinal portion 16 of the crossbeam, which is made of plastic-containing material.

The invention claimed is:

1. A dashboard crossbeam assembly for a vehicle, including:

a dashboard crossbeam with a first longitudinal portion, the first longitudinal portion forming a plurality of fastening interfaces, each fastening interface comprising a recess for receiving a lug, and at least one fastening tab comprising at least one lug received in one of the recesses forming a fastening interface, wherein the plurality of fastening interfaces comprises:

a first plurality of fastening interfaces in the form of recesses for receiving a lug, opening onto a first face of the first longitudinal portion, and a second plurality of fastening interfaces in the form of recesses for receiving a lug, opening onto a second face of the first longitudinal portion, wherein the first and second faces of the first longitudinal portion are opposite each other, and wherein the first longitudinal portion comprises a substantially S-shaped cross section, each recess being delimited by a central branch and an end branch of the S, on the one hand, and by two reinforcing ribs, on the other hand.

2. The dashboard crossbeam assembly according to claim 1, wherein the first longitudinal portion is made of plastic containing material.

3. The dashboard crossbeam assembly according to claim 1, wherein the at least one fastening tab comprises two lugs, each received in a respective recess.

4. The dashboard crossbeam assembly according to claim 1, comprising a first bracket for fastening to the body of the vehicle, the first bracket defining at least one interface for fastening the dashboard crossbeam to the body of the vehicle, wherein one of the first fastening bracket and the first longitudinal portion of the crossbeam defines a first protruding relief, and the other of the first fastening bracket and the first longitudinal portion of the crossbeam defines a first complementary recess for tightly receiving the first protruding relief.

5. The dashboard crossbeam assembly according to claim 1, wherein the crossbeam comprises a second longitudinal portion, fastened to the first longitudinal portion, such that the first and second longitudinal portions of the crossbeam extend substantially adjacent to each other in a direction in which the crossbeam extends.

6. The dashboard crossbeam assembly according to claim 5, wherein the second longitudinal portion is made of metal.

7. The dashboard crossbeam assembly according to claim 5, further comprising a second fastening bracket, attached to one end of the second longitudinal portion of the crossbeam, the second fastening bracket defining at least one interface for fastening the dashboard crossbeam assembly to the body of the vehicle, wherein one of the second fastening bracket and the second longitudinal portion of the crossbeam defines a second protruding relief, and the other of the second fastening bracket and the second longitudinal portion of the crossbeam defines a second complementary recess for tightly receiving the second protruding relief.

8. The dashboard crossbeam assembly according to claim 5, wherein at least one of the first longitudinal portion and the second longitudinal portion includes, at a longitudinal end, a recess for tightly receiving a longitudinal end of the other, among the second longitudinal portion and the first longitudinal portion.

9. A dashboard crossbeam assembly for a vehicle, including:

a dashboard crossbeam with a first longitudinal portion, the first longitudinal portion forming a plurality of fastening interfaces, each fastening interface comprising a recess for receiving a lug, and at least one fastening tab comprising at least one lug received in one of the recesses forming a fastening interface, wherein the crossbeam comprises a second longitudinal portion, fastened to the first longitudinal portion, such that the first and second longitudinal portions of the crossbeam extend substantially adjacent to each other in a direction in which the crossbeam extends;

wherein at least one of the first longitudinal portion and the second longitudinal portion includes, at a longitudinal end, a recess for tightly receiving a longitudinal end of the other, among the second longitudinal portion and the first longitudinal portion, the dashboard crossbeam assembly further comprising a connector for fastening the first and second longitudinal portions of the crossbeam, with:

at least one lug tightly received in a recess of the first longitudinal portion of the crossbeam, forming a fastening interface;

a first recess for receiving a longitudinal end of the first longitudinal portion of the crossbeam; and a second recess for receiving a longitudinal end of the second portion of the crossbeam.

10. The dashboard crossbeam assembly according to claim 9, wherein the plurality of fastening interfaces comprises:

a first plurality of fastening interfaces in the form of recesses for receiving a lug, opening onto a first face of the first longitudinal portion, and a second plurality of fastening interfaces in the form of recesses for receiving a lug, opening onto a second face of the first longitudinal portion.

11. The dashboard crossbeam assembly according to claim 10, wherein the first and second faces of the first longitudinal portion are opposite each other.

12. The dashboard crossbeam assembly according to claim 9, wherein the first recess of the fastening connector and the longitudinal end of the first longitudinal portion of the crossbeam received therein are suitable for at least one among limiting and preventing the movements of the first longitudinal portion of the crossbeam relative to the fastening connector.

13. The dashboard crossbeam assembly according to claim 9, wherein the fastening connector forms at least one among a strut for fastening the dashboard crossbeam assembly to the body of a motor vehicle and a fastening tab for fastening an accessory to the crossbeam.

14. The dashboard crossbeam assembly according to claim 9, further comprising at least one screw for fastening the fastening connector with at least one among the first longitudinal portion and the second longitudinal portion of the crossbeam.

15. The dashboard crossbeam assembly according to claim 14, wherein the dashboard crossbeam assembly comprises a first screw for fastening the fastening connector to the first longitudinal portion of the crossbeam and a second screw for fastening the fastening connector to the first and second longitudinal portions of the crossbeam.

16. The dashboard crossbeam assembly according to claim 9, wherein the first longitudinal portion comprises a substantially S-shaped cross section, each recess being delimited by a central branch and an end branch of the S, on the one hand, and by two reinforcing ribs, on the other hand.

17. A dashboard assembly for a vehicle, comprising a dashboard and a dashboard crossbeam assembly according to claim 9, the dashboard being fastened to the dashboard crossbeam assembly.

\* \* \* \* \*